US008855463B2

(12) United States Patent
Yoshitani (10) Patent No.: US 8,855,463 B2
(45) Date of Patent: Oct. 7, 2014

(54) IMAGE STORING APPARATUS, CONTROL METHOD FOR IMAGE STORING APPARATUS, AND CONTROL PROGRAM FOR IMAGE STORING APPARATUS

(75) Inventor: Akihiro Yoshitani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 812 days.

(21) Appl. No.: 13/051,039

(22) Filed: Mar. 18, 2011

(65) Prior Publication Data

US 2011/0167099 A1  Jul. 7, 2011

Related U.S. Application Data

(62) Division of application No. 11/447,158, filed on Jun. 6, 2006, now abandoned.

(30) Foreign Application Priority Data

Jun. 9, 2005 (JP) ................... 2005-168954

(51) Int. Cl.
*H04N 5/77* (2006.01)
*H04N 1/21* (2006.01)
*H04N 1/00* (2006.01)

(52) U.S. Cl.
CPC ...... *H04N 1/2175* (2013.01); *H04N 2201/0087* (2013.01); *H04N 1/00148* (2013.01); *H04N 2201/0084* (2013.01)
USPC ........... 386/224; 386/247; 386/294; 386/295; 386/335

(58) Field of Classification Search
CPC .................. G11B 2220/61; G11B 2220/2541; G11B 2220/2562; G06F 17/3028; G06F 17/30067; H04N 5/765; H04N 5/907
USPC .......................... 386/224, 247, 294, 295, 335
See application file for complete search history.

(56) References Cited

U.S. PATENT DOCUMENTS

| | | | |
|---|---|---|---|
| 7,187,407 B2 | 3/2007 | Kanehiro et al. | |
| 7,446,904 B2 * | 11/2008 | Stanich et al. | 358/3.13 |
| 8,229,273 B2 * | 7/2012 | Katsuo et al. | 386/224 |
| 8,314,947 B2 * | 11/2012 | Tsuji | 358/1.13 |
| 8,417,687 B2 * | 4/2013 | Kawate et al. | 707/711 |
| 8,606,079 B2 * | 12/2013 | Shibata et al. | 386/248 |

(Continued)

FOREIGN PATENT DOCUMENTS

| | | | |
|---|---|---|---|
| JP | 2000-184324 A | 6/2000 | |
| JP | 2001-155425 A | 6/2001 | |

(Continued)

*Primary Examiner* — Helen Shibru (74) *Attorney, Agent, or Firm* — Fitzpatrick, Cella, Harper & Scinto (57) ABSTRACT

In an image storing apparatus (photostorage), files are enabled to be certainly copied (or moved) without overlapping by the fairly simple operation. When image data is read out of a recording medium connected through a slot and stored into a high capacity storage unit, a management table in which a unique ID of the recording medium and the maximum value of file IDs of image files stored in the recording medium have been associated is used and the image files having the file IDs larger than the maximum value of the file IDs corresponding to the unique ID of the recording medium in the management table are read out and stored into the high capacity storage unit. The file ID is formed by combining a directory number and a file number in the DCF standard.

20 Claims, 4 Drawing Sheets

(56) References Cited

U.S. PATENT DOCUMENTS

| | | | |
|---|---|---|---|
| 2002/0191079 A1* | 12/2002 | Kobayashi et al. | 348/207.1 |
| 2004/0184775 A1 | 9/2004 | Nakamura et al. | |
| 2004/0189959 A1 | 9/2004 | Kito | |
| 2004/0234240 A1 | 11/2004 | Kurosawa et al. | |
| 2007/0255727 A1* | 11/2007 | Hirose et al. | 707/100 |

FOREIGN PATENT DOCUMENTS

| | | |
|---|---|---|
| JP | 2004-007483 A | 1/2004 |
| JP | 2005-032315 A | 2/2005 |
| WO | 2005/006335 A1 | 1/2005 |

\* cited by examiner

| ITEM NUMBER | Media ID | Max File ID |
|---|---|---|
| 1 | AAAAAAAA | 0010004 |
| 2 | BBBBBBBB | 1000028 |
| 3 | CCCCCCCC | 0020112 |
| ⋮ | ⋮ | ⋮ |
| ** | XXXXXXXX | YYYYYYY |
| ⋮ | ⋮ | ⋮ |

IMAGE STORING APPARATUS, CONTROL METHOD FOR IMAGE STORING APPARATUS, AND CONTROL PROGRAM FOR IMAGE STORING APPARATUS

This application is a division of Application No. 11/447,158 filed Jun. 6, 2006.

BACKGROUND OF THE INVENTION

1. Field of the Invention

The invention relates to an image storing apparatus for reading out image data from a recording medium or an external apparatus and storing it into a high capacity storage unit, a control method for such an apparatus, and a control program for such an apparatus.

2. Related Background Art

In many cases, photo image data formed by photographing an object by a digital camera is temporarily stored into a recording medium such as a compact flash (registered trademark (hereinbelow, omitted)) mounted in the digital camera. Since a capacity of the recording medium is not so large, generally, the photo image data in the recording medium is copied into a hard disk or the like of a PC (personal computer) or is read out of the hard disk and copied into a CD-R or a DVD-R, thereby accumulating/storing the data. That is, in most cases, the recording medium is used only as a temporary recording location of the photo image data.

In recent years, a product called a "photostorage" having a high capacity storage unit such as a hard disk device and a slot of the recording medium has been proposed (for example, refer to Japanese Patent Application Laid-Open No. 2000-184324).

Such a type of photostorage has a function of automatically copying files in the recording medium into the hard disk device when the recording medium in which the photo image data has been stored is mounted into the slot, and can accumulate/store a large amount of photo image data without using the PC.

Such a function of the photostorage can be embodied by constructing it as a stand-alone product, by constructing it by PC hardware having the high capacity storage unit and software, or by constructing it by a printer which can perform direct printing, a multifunction (or hybrid) image processing apparatus in which a printing function, a communicating function, and the like are integrated, or the like so long as the high capacity storage unit is provided for such an apparatus.

According to the photostorage as disclosed in Japanese Patent Application Laid-Open No. 2000-184324, when the recording medium is mounted, the following operation is executed.

(1) After all of the files in the recording medium were copied into the built-in hard disk, all of the files in the recording medium are deleted.

Or, according to other photostorages which are commercially available at present, similarly, when the recording medium is mounted, the following operation is executed.

(2) Although all of the files in the recording medium are copied into the built-in hard disk, all of the files in the recording medium are left.

In the above construction (1) in the related art, there is an inconvenience in the case where even after the data in the card was copied into the photostorage, the user wants to leave the data in the card (in the case where the data is copied into the PC and used later, or the like).

In the above construction (2) or (1) in the related art, similarly, there is a possibility that the same image file is written into the photostorage many times in dependence on a using method of the user, there is also such a problem that the storage capacity of the photostorage is restricted more than it is needed or an overlap amount of the same file increases and it is troublesome to rearrange them later.

To avoid such a problem, a managing operation in which the user discriminates a file name or contents and selects files to be copied (or moved) while deciding whether or not the image files are copied (or moved) is necessary. Such a managing operation is not impossible in the construction using the PC and the software. However, in the case of the stand-alone type apparatus, the printer, the multifunction image processing apparatus, or the like, generally, the hardware (display, operation input means) enough to embody such a user interface as to browse the contents of the medium or select the files is not provided. Therefore, it is actually impossible to realize such a managing operation.

Even if such a managing operation can be performed, the operation to copy (or move) the files without overlapping is not so easy but it takes a time and is troublesome for the user. Ideally, there is demanded such a construction that the medium in which the image files have been stored is connected to the slot of the photostorage (or the digital camera or the like is connected to a USB port of the photostorage), and the files can be certainly copied (or moved) without overlapping only by the operation (for example, one specific button is pressed) which can be easily executed even by the user interface of the stand-alone type apparatus, the printer, the multifunction image processing apparatus, or the like without needing any other operation.

SUMMARY OF THE INVENTION

It is an object of the invention to enable files to be certainly copied (or moved) without overlapping by a fairly simple operation in an image storing apparatus (photostorage) in consideration of the above problems.

DETAILED DESCRIPTION OF THE PREFERRED EMBODIMENT

An embodiment regarding an image storing apparatus (photostorage) to which the invention is applied will be described in detail hereinbelow with reference to the drawings.

Embodiment 1

Figure 1:
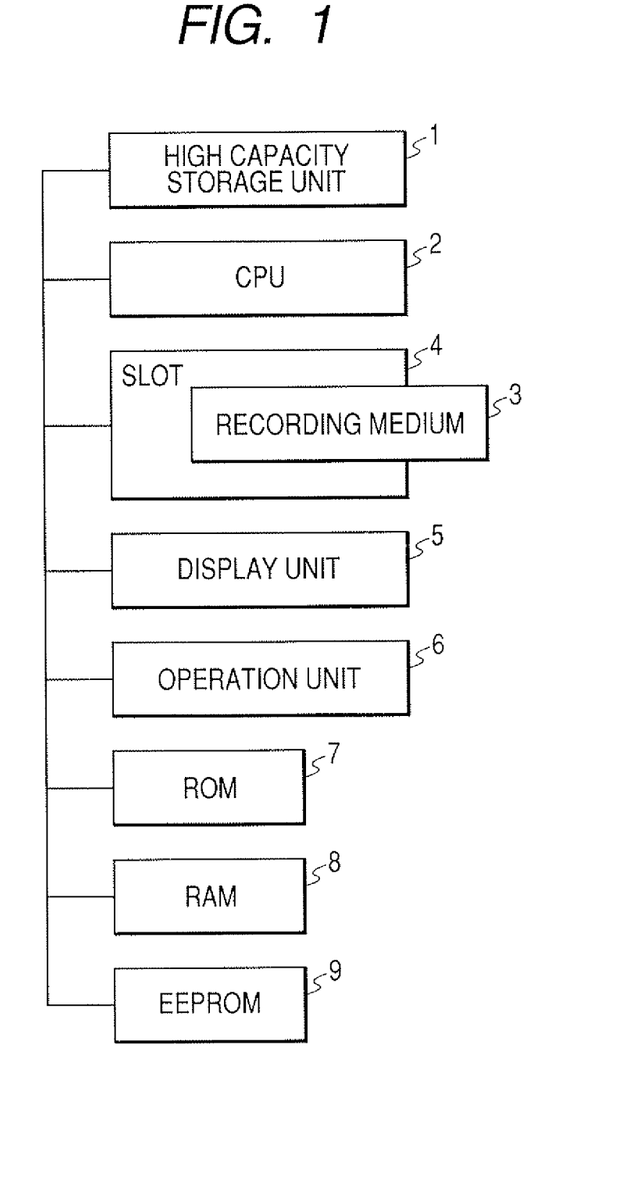
FIG. 1 is a block diagram showing a fundamental construction of an image storing apparatus to which the invention is applied.

FIG. 1 shows a construction of the image storing apparatus (photostorage) to which the invention is applied. The construction of FIG. 1 is common not only to the stand-alone type photostorage but also to the case of constructing the photostorage by the PC hardware and software or the case of mounting the photostorage in the printer which can perform the direct printing, the multifunction image processing apparatus in which the printing function, the communicating function, and the like are integrated, or the like.

In the diagram, reference numeral 1 denotes a high capacity storage unit to store image data. The high capacity storage unit 1 is constructed by a hard disk device or the like.

Reference numeral 2 denotes a CPU for integratedly controlling a whole system. The CPU 2 controls the photostorage operation in accordance with software which has been stored in a ROM 7 (or the high capacity storage unit 1) and which will be explained hereinafter. In this instance, a RAM 8 is used as a work area. Management data or the like necessary for controlling the apparatus is stored in an EEPROM 9 even in the OFF state of a power source of the apparatus.

A management table (FIG. 2) to control the photostorage operation as will be explained hereinafter is used in the embodiment. This management table is stored in the high capacity storage unit 1 (or EEPROM 9) or the like.

Reference numeral 3 denotes a recording medium such as compact flash (CF) card, SD card, or the like which can record the image data. This recording medium is a general medium and can be used in common with digital cameras (for example, products made by other companies) unrelated to the present apparatus. The recording medium 3 can be also replaced by an external apparatus (digital camera, PC, or the like) in which the image data has been stored as will be explained hereinafter.

Reference numeral 4 denotes a slot adapted to mount the recording medium 3. The CPU 2 can write and read digital data into/from the recording medium 3. Although a denomination "slot" is used hereinbelow with respect to the member shown by reference numeral 4 for convenience of explanation, the member shown by reference numeral 4 can be also replaced by arbitrary interface means such as a USB port or the like to which the recording medium or external apparatus in which the image data has been stored can be connected.

Reference numerals 5 and 6 denote means constructing a user interface. That is, reference numeral 5 denotes a display unit which can display bit map image data and reference numeral 6 denotes an operation unit which is used for the user to operate the present apparatus by using a cursor key or the like.

The blocks shown by reference numerals 1, 2, 4, 5, and 6 are mutually connected by a system bus of the apparatus.

Prior to explaining the operation of the image storing apparatus having the foregoing construction, particularly, the control which is made by the CPU 2, the DCF standard specifying a file naming rule and the like when the digital camera records the photo image data into the recording medium will be first described.

At present, in most of the digital cameras, when an image file is written into the recording medium, a file name and a directory name are added to the image file and the resultant image file is stored in accordance with the DCF (Design-rule for Camera File system) standard specified by Japanese Electronic Industry Development Association (JEIDA).

Figure 4:
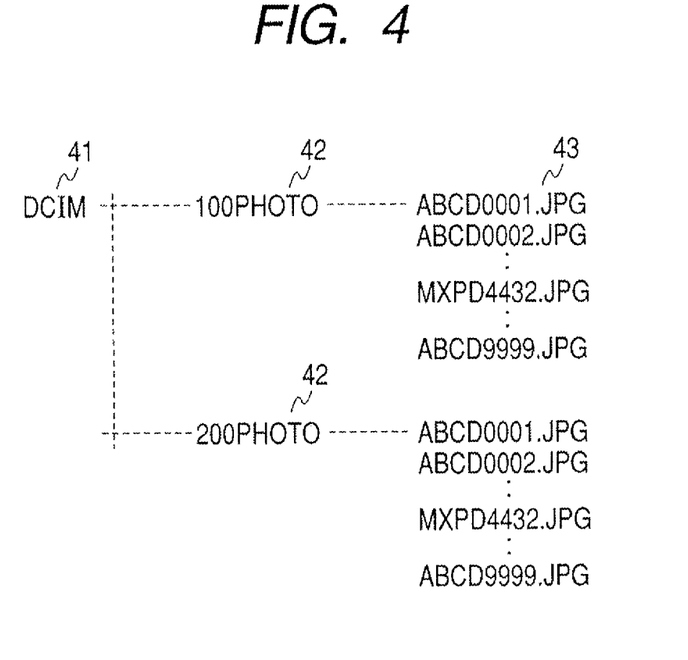
FIG. 4 is an explanatory diagram showing a construction of a file system formed on a recording medium in accordance with the DCF standard.

FIG. 4 shows an example of a structure in the medium in which image files have been recorded by a recording apparatus (writer) such as a digital camera or the like on the basis of the DCF standard. Reference numerals 41 and 42 denote directories (folders). That is, reference numeral 41 denotes the still image recording directory specified by the DCF. The directories 42 as other layers can be stored under the directory 41. In this instance, the two directories of directory names "100PHOTO" and "200PHOTO" are formed and image files 43 of an Exif(JPEG) format are stored under each directory 42.

In the DCF standard, each image file is managed by the directory name including numerals (directory number) of three digits and a file name including numerals (file number) of four digits. Between them, ordinarily, the directory number is embedded in the head of the directory name like "100PHOTO" or "200PHOTO" in FIG. 4 and the file number is embedded in the position of four digits just before a JPG extension like "ABCD0001.JPG", "MXPD4432.JPG", or the like (all of them are shown by the decimal notation).

According to the DCF standard, the image file can be managed by the numerals of the total of seven digits. In the invention, the decimal number of seven digits constructed by combining the directory number as upper digits and the file number as lower digits is assumed to be a "file ID" and used as data which specifies the file, thereby making it possible to prevent the overlap copy (or movement) in the management table with the simple construction.

That is, in the DCF standard, it is specified that when the image data is recorded into the same recording medium, the 7-digit number has to be formed by a monotone increase without the overlap. For example, in the digital camera corresponding to the DCF standard, when the file in which the numerical value of the file ID is the largest among the files in the mounted recording medium is assumed to be

¥DCIM¥201PHOTO¥TEST1092.JPG since the file ID of this file is equal to 2011092, when this digital camera writes a new image file into this recording medium, the file ID has to be equal to or larger than 2011093.

That is, the directory number of the directory in which the file is written has to be equal to or larger than 201 and the file number of this file has to be equal to or larger than 1093 (however, the number of the ID may be skipped).

Since this rule is also protected when the same recording medium is often used by a plurality of digital cameras, so long as the same recording medium is continuously used, the file ID of the image file which is newly written monotonously increases without overlapping.

When the photo image data is copied from the recording medium into the image storing apparatus, the maximum value of the file IDs (=file IDs of the latest photo image data at that point of time) is stored in the image storing apparatus every recording medium with respect to the copied file, so that when the recording medium in which the new photo image data has been recorded is mounted to the image storing apparatus at the next time, only the files having the file IDs larger than such a file ID to the targets is set to be copied (moved) to the image storing apparatus. Therefore, it is possible to prevent the same image data from being copied (moved) to the image storing apparatus.

As recording media which are used in the digital cameras, there are various kinds of media such as smart media, compact flash, SD card, and the like. Among them, with respect to the medium such as an SD card which is widely used, a unique ID exists every medium. Inherently, the unique ID is used to prevent the copy of the data with a copyright by encrypting the data by using the unique ID as a key (for example, refer to Japanese Patent Application Laid-open 2001-155425 or the like). In the embodiment, however, it is used merely to identify the recording medium.

Figure 2:
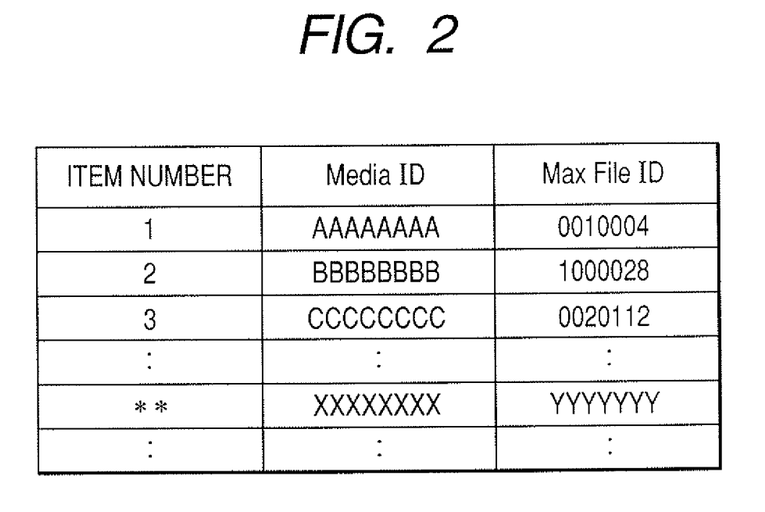
FIG. 2 is an explanatory diagram showing a construction of a management table (ID table) of the apparatus of FIG. 1.

In the embodiment, when the photo image data is copied to the image storing apparatus in the embodiment from the recording medium in which the photo image data obtained by photographing the object by the digital camera corresponding to the DCF standard has been recorded, the management table as shown in FIG. 2 in which the maximum value of the file IDs (hereinafter, referred to as MaxFileID) of the copied photo image data and the unique ID of the recording medium (hereinafter, referred to as MediaID) are combined is referred to. A storing destination of the management table is assumed to be the high capacity storage unit 1, the EEPROM 9, or a memory (not shown) in the apparatus as mentioned above. The management table is called an ID table hereinbelow.

In the image storing apparatus of the embodiment, when the recording medium in which the image files have been stored is subsequently inserted, the CPU 2 checks the unique ID of the inserted medium and searches the ID table by using the unique ID, so that the latest file ID of the photo image data which has previously been copied can be recognized. Therefore, in the present copying process, such a situation that the same file as the image data which has already been copied to the image storing apparatus is copied so as to overlap is prevented.

Figure 3:
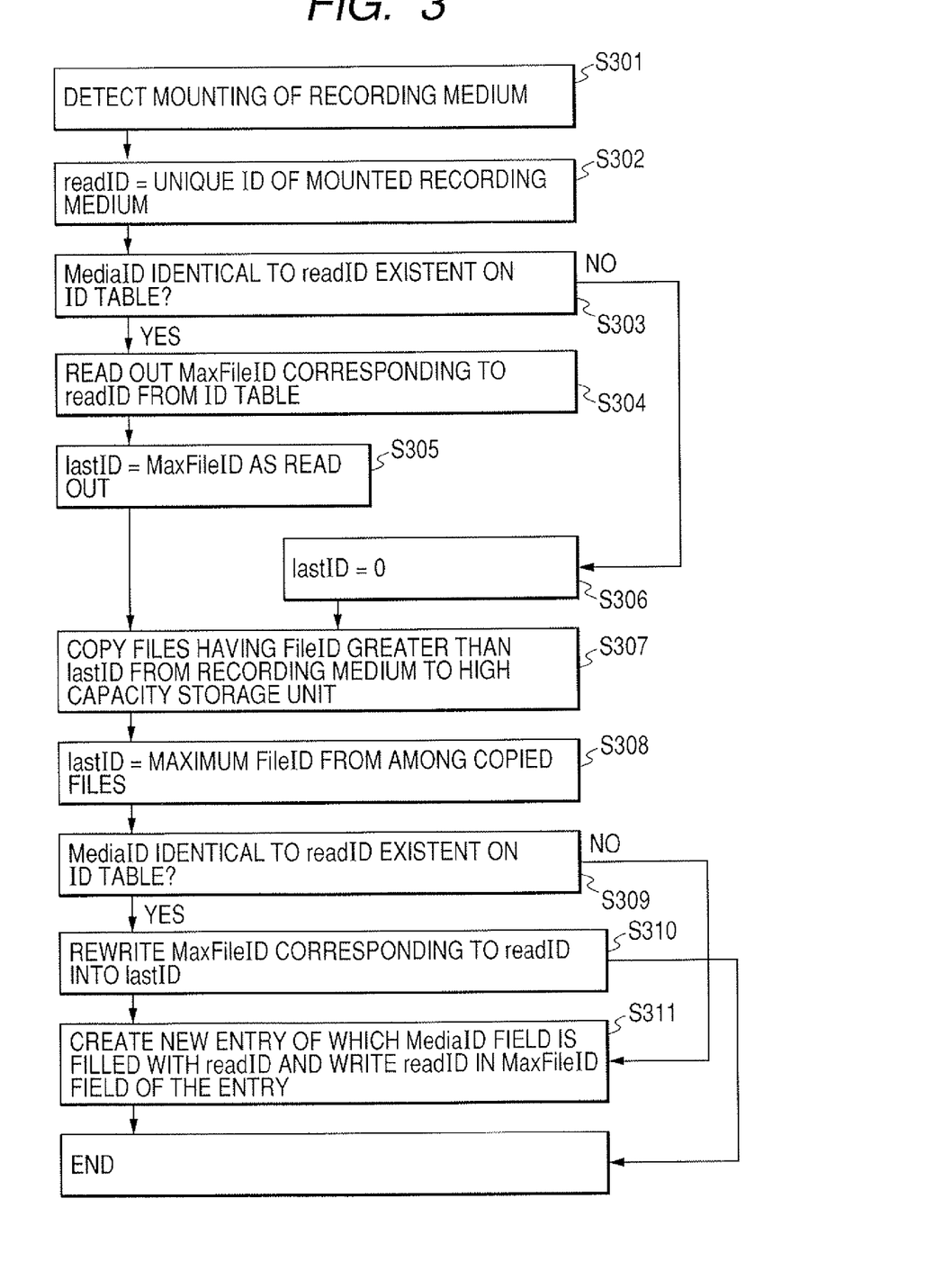
FIG. 3 is a flowchart showing image data storing control in the apparatus of FIG. 1.

FIG. 3 shows a control procedure which is executed by the CPU 2 when the photo image data recorded in the recording medium mounted into the slot 4 of the image storing apparatus is copied to the high capacity storage unit 1. The procedure of FIG. 3 is stored as a program of the CPU 2 into the ROM 7 or the high capacity storage unit 1.

When the user mounts the recording medium of a predetermined format in which the image files have been recorded into the slot 4 of the image storing apparatus, the CPU 2 detects the mounting of the recording medium by an interface signal of the slot 4 (or by a media sensor or the like if the sensor or the like of the recording medium has been provided for the slot) (step S301).

Subsequently, the unique ID of the recording medium is read out and its value is set into a variable readID (step S302). The variable readID is held in a predetermined area or the like in the RAM 8 (this is true of other variables).

Whether or not "readID" exists in a column of MediaID in the ID table of FIG. 2 is searched. If an entry whose readID coincides with the value of MediaID exists in the ID table, that is, if the recording medium which was read in the past has been inserted, the processing routine advances to step S304. If such entries do not exist, step S306 follows (step S303).

If the recording medium which was read in the past, in other words, the recording medium in which the entry having readID identical to the value of MediaID exists in the ID table has been inserted, the value of MaxFileID corresponding to the unique ID is read out of the ID table (step S304).

The value of read-out MaxFileID is set into a variable lastID (step S305) and the processing routine advances to step S307.

If the recording medium which was not read in the past and in which readID does not exist as a value of MediaID in the ID table has been inserted, 0 is set into the variable lastID (step S306) and the processing routine advances to step S307.

Subsequently, the mounted recording medium is searched and all of the image files whose file IDs are larger than lastID among the image files recorded in the recording medium are copied (or moved) to the high capacity storage unit 1 in the image storing apparatus (step S307).

Subsequently, the file ID of the file having the largest file ID among the image files copied to the high capacity storage unit 1 in step S307 is set into the variable lastID (step S308).

A discrimination result of step S303 is checked again. If the recording medium in which readID exists as a value of MediaID of an arbitrary entry in the ID table, in other words, the recording medium which was read in the past has been inserted, the processing routine advances to step S310. If the recording medium which was not read in the past has been inserted, the processing routine advances to step S311 (step S309).

If the recording medium which was read in the past has been inserted, a column of MaxFileID of the entry in which readID in the ID table coincides with the value of MediaID is rewritten to the value of lastID (step S310) and the processing routine is finished.

If the recording medium which was not read in the past has been inserted, a new entry having the variable readID in the column of MediaID is formed in the ID table and the value of lastID is written into the column of MaxFileID (step S311) and the processing routine is finished.

As mentioned above, according to the embodiment, merely by mounting the recording medium into the image storing apparatus, when the image file is copied from the recording medium to the image storing apparatus, information of the maximum value of the file IDs in which the directory number of the DCE as upper digits and the file number as lower digits are combined is stored in association with the unique ID of the recording medium, thereby making it possible to prevent the same file from being copied to the image storing apparatus a plurality of number of times so as to overlap.

Therefore, according to the embodiment, the user can certainly copy (move) the files without overlapping by the extremely simple operation without needing the operation to rearrange the overlapped image files and select the files to be copied (moved) after the copy (or movement). Thus, such an excellent effect that the high capacity storage unit in the image storing apparatus can be efficiently used is obtained. Since the user interface to execute the complicated operation is unnecessary, the invention can be easily embodied even in the apparatus such as stand-alone type apparatus, printer, multifunction image processing apparatus, or the like which does not have the sufficient user interface means.

In the embodiment, for example, such a construction that all of the file names of the files which have been copied so far and their identification information are recorded is not used and it is sufficient to store only the maximum value of the file IDs each of which is formed by the directory number and the file number of the DCF standard in association with the unique ID of the recording medium or the external apparatus. Therefore, it is sufficient that the capacity of the management table is small and the process for maintaining the management table is extremely easy.

Further, in the embodiment, each file ID can be formed by combining the directory number and the file number in the DCF standard which are managed so as to monotonously increase without overlapping. Thus, the overlap copy (movement) of the files can be prevented by the small calculation costs without needing another overlap avoiding process.

When the recording media are different, even if they have the same file ID, there is a possibility that the contents of the photo image data differ. However, according to the embodiment, since the unique ID of the recording medium and the file ID of the file in the recording medium are associated with each other, even when the file IDs are identical, if the unique IDs of the recording media are different, such a file can be recognized as a different file and copied to the high capacity storage unit 1.

A storing structure at the time when the image file is copied to the high capacity storage unit 1 is arbitrary. For example, if a directory (folder) having a name including the unique ID of the recording medium is formed in the high capacity storage unit 1 (for example, when a recording medium is newly mounted) and the file read out of the recording medium having such a unique ID is recorded into such a directory (folder), the image file can be stored without being overwritten.

Although the unique ID of the recording medium exists in the SD card or the like, it does not exist in a part of the recording media such as a compact flash and the like, so that such a unique ID cannot be used. In this case, when the recording medium is first mounted in the slot of the image storing apparatus, the CPU 2 forms a unique value by using proper random numbers in the image storing apparatus, forms a file of a specific name including such a value (for example, ¥dcim¥miscimediaid.txt), subsequently, reads such a file, obtains the unique value, and regards such a value as a unique ID of the recording medium, so that the process of substantially the same contents as those mentioned above can be executed.

The explanation has been made above with respect to the case where the recording medium is the recording medium itself such as SD card or CF card. Naturally, the above construction can be similarly embodied even in such a construction that the recording medium is connected to an external apparatus such as digital camera or PC (mobile PC, PDA, notebook-sized PC, etc.), those apparatuses are connected to the image storing apparatus through an interface such as a USB or the like, and the recording medium operates so that it can be handled as an external storing device from the image storing apparatus side.

In such a case, it is not always necessary that the external apparatus such as digital camera, PC, or the like has a detachable recording medium. Naturally, the above construction can be similarly embodied even in such a construction that the external apparatus itself (or a storing device such as a hard disk or the like) can be regarded as a recording medium which can be connected through a proper interface such as a USB or the like.

In the case where the recording medium has been mounted in the external apparatus or the like, it is sufficient to similarly read out and use the unique ID of the recording medium. If a serial number, an MAC address (unique address of the apparatus/device), or the like of the external apparatus can be read out, those information may be substituted for the unique ID of the recording medium.

The invention can be used not only for the stand-alone type photostorage but also for various image storing apparatuses such as various constructions each having the high capacity storage unit and the function of fetching the image data. For example, the invention can be used in the photostorage constructed by the PC hardware and the software is mounted, or where the photostorage is mounted in the printer which can perform the direct printing, the multifunction image processing apparatus or the like in which the printing function, the communicating function, and the like are integrated, and the like. In addition to the method whereby the software of the invention is stored into the ROM or hard disk in those apparatuses and read out and supplied therefrom, the software can be also installed or updated via a network.

According to the above constructions, the control is made so that the image files having the file IDs lager than the maximum value of the file IDs corresponding to the unique ID of the recording medium or external apparatus in the management table are read out and stored into the high capacity storage unit. Therefore, the user can certainly copy (move) the files without the overlap by the extremely simple operation without needing the operation to rearrange the overlapped image files and select the files to be copied (moved) after the copy (or movement). Thus, such an excellent effect that the high capacity storage unit in the image storing apparatus can be efficiently used is obtained. Since the user interface to execute the complicated operation is unnecessary, the invention can be easily embodied even in the apparatus such as stand-alone type apparatus, printer, multifunction image processing apparatus, or the like which does not have the sufficient user interface means. Since it is sufficient to store only the maximum value of the file IDs in association with the unique ID of the recording medium or external apparatus, it is sufficient that the capacity of the management table is small and the process for maintaining the management table is also extremely easy.

Each of the file IDs can be formed by combining the directory number and the file number in the DCF standard which are managed so as to monotonously increase without overlapping. Thus, the overlap copy (movement) of the files can be prevented by the small calculation costs without needing another overlap avoiding process.

This application claims priority from Japanese Patent Application No. 2005-168954 filed on Jun. 9, 2005, which is hereby incorporated by reference herein.

What is claimed is:

1. An information processing apparatus for retrieving a file from a first memory in which files, each having a file ID for specifying the file, are stored with sequentially increasing file ID numerals, and for storing the thus retrieved file into a second memory, said information processing apparatus comprising:
    an acquiring unit configured to acquire the file ID of the file stored in the first memory;
    a storing control unit configured to retrieve the file from the first memory, and to store the file into the second memory; and
    a determining unit configured to determine the maximum value of the file ID, acquired by said acquiring unit, of at least one file retrieved from the first memory by said storing control unit and stored into the second memory,
    wherein said storing control unit (1) specifies at least one of the files stored in the first memory, which has a file ID larger than the maximum value determined by said determining unit, based on the file ID of the file stored in the first memory, acquired by said acquiring unit, and (2) stores the specified file into the second memory.

2. An apparatus according to claim 1, wherein the file ID is formed by combining a directory number and a file number.

3. An apparatus according to claim 1, wherein the file ID acquired by said acquiring unit indicates a directory set in the first memory, and wherein said storing control unit stores the file retrieved from the first memory into the directory indicated by the file ID and set in the second memory.

4. An information processing apparatus according to claim 1, further comprising a storage unit configured to store the maximum value of the file ID of the file, determined by said determining unit,
    wherein said storing control unit specifies the file to be stored into the second memory, based on the maximum value stored in said storage unit.

5. An apparatus according to claim 4, further comprising:
    an updating unit configured, when said storing control unit stores at least one file into the second memory, to update the maximum value of the file ID stored in said storage unit based on the file ID of the file which is stored into the second memory.

6. An information processing apparatus according to claim 4, further comprising a second acquiring unit configured to acquire a memory ID of the first memory,
    wherein said storage unit stores the maximum value of the file ID so as to correspond with the memory ID, acquired by said second acquiring unit, of the first memory storing the file corresponding to the file ID with the maximum value.

7. An information processing apparatus according to claim 6, wherein said determining unit determines the maximum value of the file ID corresponding to the first memory from the maximum values of the file IDs stored in the storage unit based on the memory ID acquired by said second acquiring unit.

8. An apparatus according to claim 6, wherein a unique ID of the first memory is used as the memory ID.

9. An apparatus according to claim 6, further comprising:
a forming unit configured to form a memory ID for the first memory, and to write the formed memory ID into the first memory,
wherein said second acquiring unit acquires the memory ID written into the first memory by said forming unit.

10. An apparatus according to claim 6, wherein when the memory ID of the first memory acquired by said second acquiring unit is not stored in said storage unit, said storage unit stores the maximum value of the file ID corresponding to the first memory, based on the file ID of the file retrieved from the first memory and stored into the second memory.

11. An information processing apparatus according to claim 1, wherein the first memory is an external memory.

12. An information processing apparatus according to claim 11, further comprising a detecting unit configured to detect mounting of the first memory to the apparatus,
wherein said storing control unit stores the file stored in the first memory into the second memory, when said detecting unit detects the mounting of the first memory.

13. An information processing apparatus according to claim 11, wherein the first memory is an external memory which is mounted to an external device connected to the apparatus.

14. An information processing apparatus according to claim 11, wherein the first memory is an external memory which is included in an external device connected to the apparatus.

15. An information processing apparatus according to claim 14, wherein said determining unit determines the maximum value of the file ID corresponding to ID of the external device.

16. An information processing apparatus according to claim 13, wherein the external device is a digital camera or a PC.

17. An information processing apparatus according to claim 1, wherein the apparatus is a stand alone-type photo storage, a PC, or a printer.

18. An information processing apparatus according to claim 1, wherein the second memory is included in the apparatus.

19. A method for controlling an information processing apparatus for retrieving a file from a first memory in which files, each having a file ID for specifying the file, are stored with sequentially increasing file ID numerals, and for storing the thus retrieved file into a second memory, said method comprising the steps of:
acquiring, with an acquiring unit of the information processing apparatus, the file ID of the file stored in the first memory;
retrieving, with a storing control unit of the information processing apparatus, the file from the first memory, and to store the file into the second memory;
determining, with a determining unit of the information processing apparatus, the maximum value of the file ID, acquired by the acquiring unit, of at least one file retrieved from the first memory by the storing control unit and stored into the second memory; and
using the storing control unit to (1) specify at least one of the files stored in the first memory, which has a file ID larger than the maximum value determined by the determining unit, based on the file ID of the file stored in the first memory, acquired by the acquiring unit, and (2) store the specified file into the second memory.

20. A non-transitory computer-readable storage medium storing a control program for an information processing apparatus, wherein members constructing the information processing apparatus are controlled according to a method for the information processing apparatus according to claim 19.

* * * * *